United States Patent Office 3,548,020
Patented Dec. 15, 1970

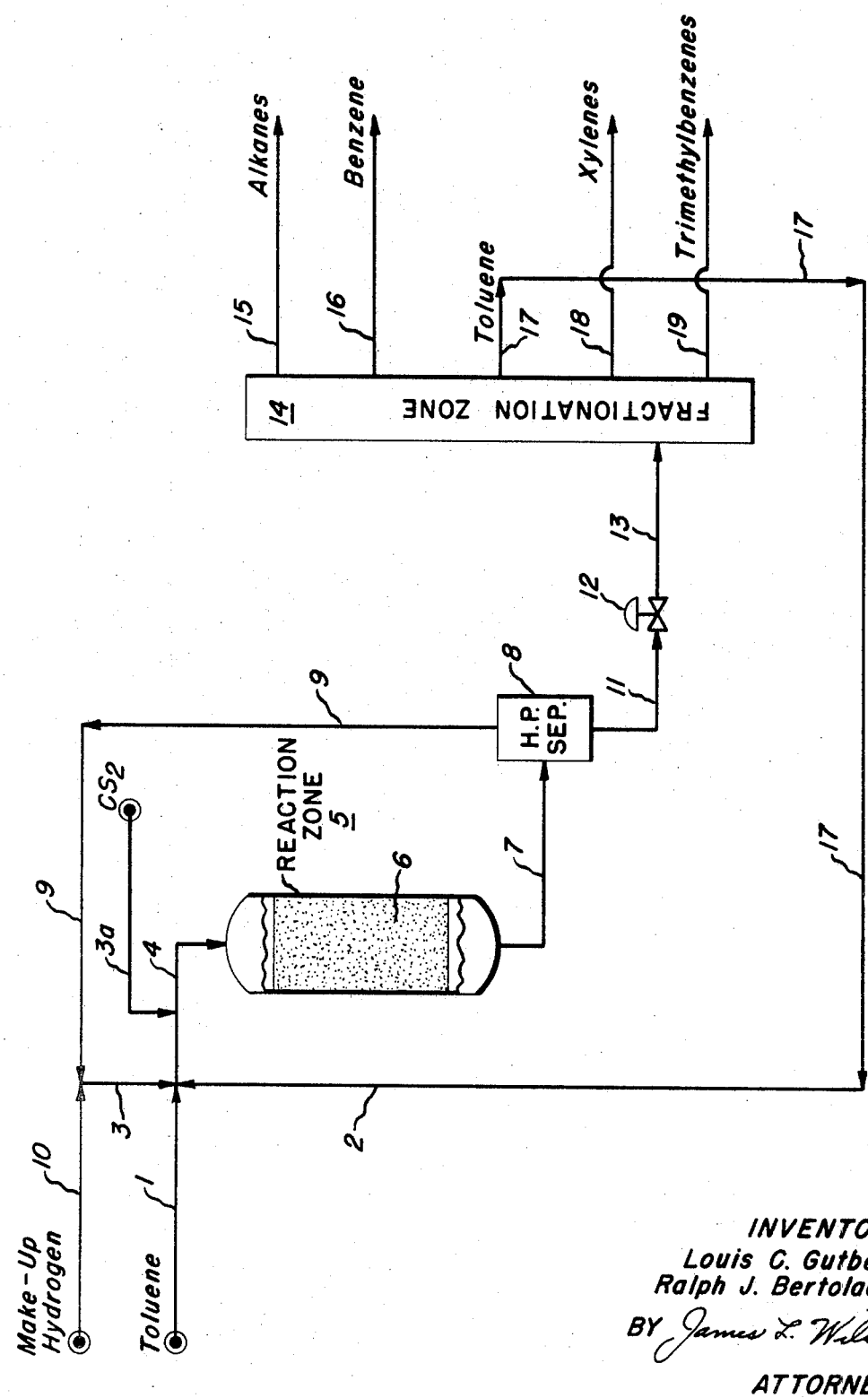

3,548,020
PROCESS FOR THE DISPROPORTIONATION OF PETROLEUM HYDROCARBONS
Louis C. Gutberlet, Crown Point, and Ralph J. Bertolacini, Chesterton, Ind., assignors to Standard Oil Company, Chicago, Ill., a corporation of Indiana
Continuation-in-part of application Ser. No. 672,293, Oct. 2, 1967. This application Oct. 29, 1969, Ser. No. 872,155
Int. Cl. C07c 3/62
U.S. Cl. 260—672                      19 Claims

ABSTRACT OF THE DISCLOSURE

Process comprises contacting petroleum hydrocarbons with a catalytic composition under suitable disproportionation conditions, said catalytic composition comprising a physical particulate mixture of component (A) and component (B). Component (A) comprises an amorphous silica-alumina support having dispersed uniformly through the matrix thereof an ultrastable, large-pore crystalline aluminosilicate material and having impregnated thereon a metal of Group VI–A, preferably molybdenum, and a metal of Group VIII, preferably cobalt; component (B) comprises Y-type molecular sieves which have been cation-exchanged with a Group VIII metal, preferably nickel. The catalyst is subjected to a sulfur-providing compound to inhibit demethanation.

CROSS REFERENCE TO RELATED APPLICATION

This is a continuation-in-part application of co-pending U.S. Patent application Ser. No. 672,293 which was filed Oct. 2, 1967, and is now abandoned.

BACKGROUND OF THE INVENTION

The present invention is directed to a process for the conversion of petroleum hydrocarbons More particularly, it is directed to a process for the disproportionation of petroleum hydrocarbons. Still more particularly, it is directed to a vapor-phase process for the disproportionation of alkylaromatic hydrocarbons.

In a co-pending U.S. Patent application, Ser. No. 672,-005, filed concurrently with the parent of this present application on Oct. 2, 1967 and commonly assigned therewith there is disclosed a new catalytic composition and a hydrocracking process employing that catalytic composition. It has been found that this new catalytic composition is also suitable for the disproportionation of petroleum hydrocarbons and that it is suitable particularly for the disproportionation of alkylaromatic hydrocarbons. Furthermore, it is believed that this new catalytic composition is a suitable catalyst for aromatic dealkylation and the isomerization of aromatics and paraffins.

The invention pertains to processes for treating mineral oils which result in a chemical alteration of at least some of the hydrocarbon molecules of the mineral oils to form mineral oils having different properties and different chemical structures. These different chemical compounds result from the intermolecular migration of alkyl groups. For example, in the case of the disproportionation of toluene, there results benzene and the various xylenes.

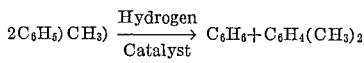

In the case of aromatic hydrocarbons, rearrangement of alkyl groups in the presence of Friedel-Crafts catalysts is well known. Such rearrangements as the transfer of alkyl groups from the toluene to form benzene and xylenes and the transfer of alkyl groups from xylenes to form toluene and trimethylbenzenes are catalyzed by strongly acidic catalysts. When Friedel-Crafts-type catalysts are employed, the reactions occur in the liquid phase. However, vapor-phase disproportionation reactions can be conducted in the presence of suitable solid catalysts.

A new vapor-phase disproportionation process has been found. The catalyst employed in this process is a very active catalytic composition.

SUMMARY OF THE INVENTION

Broadly, in accordance with the invention, there is provided a process for the disproportionation of petroleum hydrocarbons, which process comprises contacting these petroleum hydrocarbons with a catalytic composition under suitable disproportionation conditions, said catalytic composition comprising a physical particulate mixture of two components, component (A) and component (B). Component (A) comprises an amorphous silica-alumina support having dispersed uniformly through the matrix thereof an ultrastable, large-pore crystalline aluminosilicate material and having impregnated thereon a metal of Group VI–A of the Periodic Table of Elements and a metal of Group VIII. Component (B) comprises Y-type molecular sieves which have been cation-exchanged with a metal of Group VIII. For component (A), the preferred metal of Group VI–A is molybdenum and the preferred metal of Group VIII is cobalt. For component (B), the preferred metal of Group VIII is nickel. The ultrastable, large-pore crystalline aluminosilicate material may be present in the silica-alumina in an amount between about 2 and about 50 percent by weight, based on the total weight of component (A). The Group VI–A and Group VIII metals of the Periodic Table may be present in component (A) as the metals, their oxides, or mixtures thereof. The preferred Group VI–A metal, molybdenum, may be present as $MoO_3$ in an amount within the range between about 4 and 15 percent by weight, based on the weight of component (A). The preferred Group VIII metal, cobalt, may be present as CoO in an amount within the range between about 2 and about 5 percent by weight, based on the weight of component (A). In the case of component (B), the preferred metal, nickel, may be present in an amount within the range between about 0.5 and about 10 percent by weight, based on the weight of component (B). A suitable embodiment of the catalyst employed in this invention may contain component (A) in an amount within the range between about 95 percent by weight and 50 percent by weight, based on the total weight of the catalytic composition, and component (B) in an amount between about 5 percent by weight and about 50 percent by weight, based on the total weight of the catalytic composition.

The catalyst of this invention is very active. Therefore, the catalyst is subjected to a treatment with a sulfur-providing compound to inhibit the demethanation reaction which normally occurs over such catalyst when the metals of the catalyst are primarily in the reduced state. Such sulfur-providing compounds as hydrogen sulfide and carbon disulfide may be employed. This treatment is to be performed prior to or during the initial stages of the disproportionation operation. If hydrogen sulfide is used, the catalyst is advantageously subjected to the hydrogen sulfide prior to its use as a catalyst for disproportionation. If carbon disulfide is employed, it may be added to the hydrocarbon feed during the initial stages of the run. The treatment must be of such duration and the amount of sulfur-providing compound must be such that substantial amounts of the metals of the catalyst are converted to their sulfides. It is not known at this time what comprises substantial amounts of the metals. However, if the metals are in the reduced state, they will more actively catalyze the demethanation reaction. Therefore, the greater the percentage of the metal in the sulfide form, the better is the inhibition of the demethanation.

An embodiment of the process of this invention is a process to convert a petroleum hydrocarbon stream of single-ring aromatic hydrocarbons wherein alkyl groups are transferred from one molecule to another. This latter process comprises contacting the petroleum hydrocarbon stream in a hydrocarbon-conversion zone with a catalytic composition of this invention in the presence of a hydrogen-affording gas under suitable hydrocarbon disproportionation conditions.

Accordingly, a specific embodiment of the process of this invention is a process for the disproportionation of toluene. The process of this specific embodiment comprises contacting the toluene with a catalytic composition of this invention in the presence of a hydrogen-affording gas under disproportionation conditions, including an average temperature between about 700° F. and about 1100° F., preferably between about 850° F. and 1000° F., and recovering the disproportionated product and separating it into its various component hydrocarbons. The catalyst of this specific embodiment of the instant invention comprises a physical mixture of particles comprising the oxides of cobalt and molybdenum supported on an acidic silica-alumina cracking support having dispersed in the porous matrix thereof ultrastable, large-pore crystalline aluminosilicate material in an amount between about 2 and 50 percent by weight of the cracking support and particles comprising nickel-cation-exchanged Y-type molecular sieves. Preferably the cracking support is a low-alumina silica-alumina cracking catalyst. The catalyst is pretreated with gas containing a minor amount of hydrogen sulfide, e.g., about 8 percent hydrogen sulfide. The pretreatment is carried out at a pressure of about 300 p.s.i.g. for 2 hours. The flow rate of the pretreating gas is maintained between about 50,000 and about 300,000 standard cubic feet per hour per ton of catalyst. The temperature of the catalyst is initially about 500° F. and is raised to a temperature of about 750° F. during the first hour and then maintained at the latter temperature during the second hour of the pretreatment.

DESCRIPTION OF THE DRAWING

The process of the present invention will be understood more easily through the use of the attached drawing. This drawing is a simplified schematic flow diagram of a specific embodiment of the process of this invention. Auxiliary equipment, such as pumps and heat exchangers, is not shown in the drawing. Such auxiliary equipment is well-known to those skilled in the art and the uses and locations of this equipment in this particular process system will be recognized easily by those having ordinary skill in the art.

DESCRIPTION AND PREFERRED EMBODIMENTS OF THE INVENTION

The process of this invention will be understood from the following description and example.

The process of this invention is a process for the disproportionation of petroleum hydrocarbons. Particularly, it is a process for the disproportionation of alkyl aromatic hydrocarbons wherein the alkyl groups are transferred from one molecule to another.

The success of this disproportionation process is due primarily to the use of the particular catalytic composition which is employed therein and the operating conditions that are used.

Typically, the feedstock is mixed with a hydrogenleum hydrocarbon streams which contain single-ring aromatic hydrocarbons which boil below about 650° F. Such aromatic hydrocarbon streams may be a petroleum hydrocarbon fraction which contains aromatics or it may be a purified aromatic hydrocarbon. For example, the feedstock of this invention may contain toluene, ortho-xylene, meta-xylene, and para-xylene, trimethylbenzenes, and tetramethylbenzenes.

Typically, the feedstock is mixed with a hydrogen-affording gas and pre-heated to a suitable disproportionation temperature, and then transferred to the disproportionation reaction zone, which may contain one or more reactors. Advantageously, the feed is substantially completely vaporized before being introduced into the reaction zone.

The feedstock is contacted in the disproportionation reaction zone with the hereinafter described catalyst in the presence of hydrogen-affording gas. Advantageously, a hydrogen-to-oil ratio of at least 1,000 standard cubic feet of hydrogen per barrel of feed (s.c.f.b.) is employed, and the hydrogen-to-oil ratio may range up to 50,000 s.c.f.b. Preferably, the hydrogen-to-oil ratio may range between about 5,000 s.c.f.b. and 30,000 s.c.f.b. Other operating conditions include an elevated temperature ranging between about 700° F. and about 1100° F., preferably between about 850° F. and about 1000° F.; an elevated pressure ranging between about 100 p.s.i.g. and about 1000 p.s.i.g., preferably between about 200 p.s.i.g. and about 500 p.s.i.g.; and a liquid hourly space velocity (LHSV) ranging between about 0.1 and about 20 volumes of hydrocarbon per hour per volume of catalyst, preferably between about 1 and 10 volumes of hydrocarbon per hour per volume of catalyst. The exothermic demethanation reaction that occurs in the disporportionation reaction zone may be controlled by the treatment of the catalyst with sulfur compounds, such as hydrogen sulfide and carbon disulfide, either prior to or at the start of the disproportionation reaction.

The catalytic composition of this invention comprises a physical particulate mixture of 2 components (A) and (B). Component (A) comprises an amorphous silica-alumina support having dispersed uniformly through the matrix thereof an ultrastable, large-pore crystalline aluminosilicate material and having impregnated thereon a metal of Group VIA and a metal of Group VIII of the Periodic Table of Elements. Preferably, molybdenum is selected as the metal of Group VIA and cobalt is selected as the metal of Group VIII. Component (B) comprises Y-type molecular sieves which have been exchanged with a metal of Group VIII. The preferred metal for this cation exchange is nickel.

There is now available an ultrastable, large-pore crystalline aluminosilicate material. This ultrastable, large-pore crystalline auminosilicate material, sometimes hereinafter referred to as "ultrastable aluminosilicate material," is employed in the catalytic composition of the present invention. It is an important component of that catalytic composition and is believed to be quite different from the prior art aluminosilicates employed in hydrocarbon conversion catalysts. It is an ultrastable material; that is, it is stable to exposure to elevated temperatures and is stable to repeated cycles of wetting and drying.

The aluminosilicate materials that are employed in the catalytic composition of the process of the invention are large pore materials. By large pore material is meant a material that has pores which are sufficiently large to permit the passage thereinto of benzene molecules and larger molecules, and the passage therefrom of reaction products. For use in catalysts that are employed in petroleum hydrocarbon conversion processes, it is preferred to employ a large-pore crystalline aluminosilicate material having a pore size of at least 8 to 10 angstrom units (A.). The ultrastable aluminosilicate material of the catalyst of the present invention possesses such a pore size.

An example of the ultrastable, large-pore crystalline alumino-silicate material that is employed in the catalyst of this invention is Z–14US zeolite, which is described in the U.S. Pat. 3,293,192.

The ultrastable aluminosilicate material is quite stable to exposure to elevated temperatures. This stability may be demonstrated by its surface area after calcination at 1725° F. For example, after a two-hour calcination at 1725° F., a surface area that is greater than 150 square meters per gram (m.²/gm.) is retained. Moreover, its stability is demonstrated by its surface area after a steam treatment with an atmosphere of 25 percent steam at a temperature of 1525° F. for 16 hours. The surface area after this steam treatment is greater than 200 m.²/gm. This stability to elevated temperatures is discussed in U.S. Pat. 3,293,192.

The ultrastable aluminosilicate material exhibits extremely good stability toward wetting, which is defined as that ability of a particular aluminosilicate material to retain surface area or nitrogen-adsorption capacity after contact with water or water vapor. It has been found that ultrastable, large-pore crystalline aluminosilicate material containing about 2 percent sodium (the "soda" form of the ultrastable aluminosilicate material) exhibited a loss in nitrogen-adsorption capacity that is less than 2 percent per wetting, when tested for stability to wetting by subjecting the material to a number of consecutive cycles, each cycle consisting of a wetting and a drying.

The cubic unit cell dimension of the ultrastable, large-pore crystalline aluminosilicate material is within the range of about 24.20 A. to about 24.55 A. Since the X-ray techniques employed today to measure this dimension are much more sophisticated and accurate than those used to obtain the earlier measurements, this range has been slightly enlarged over that which had been disclosed previously in Ser. No. 672,005, the parent of this application.

The infrared spectra of dry ultrastable, large-pore crystalline aluminosilicate material always show a prominent band near 3700 cm.$^{-1}$ (3695±5 cm.$^{-1}$), a band near 3750 cm.$^{-1}$ (3745±5 cm.$^{-1}$), and a band near 3625 cm.$^{-1}$ (±10 cm.$^{-1}$. The band near 3750 cm.$^{-1}$ is typically seen in the spectra of all synthetic faujasites. The band near 3625 cm.$^{-1}$ is usually less intense and varies more in apparent frequency and intensity with different levels of hydration. The band near 3700 cm.$^{-1}$ is usually more intense than the 3750 cm.$^{-1}$ band. The band near 3700 cm.$^{-1}$ and the band near 3625 cm.$^{-1}$ appear to be characteristic of the ultrastable aluminosilicate material.

It is believed that a substantial proportion or amount of this ultrastable, large-pore crystalline aluminosilicate material is characterized by the apparently unique, well-defined hydroxyl bands near 3700 cm.$^{-1}$ and near 3625 cm.$^{-1}$ By a substantial proportion is meant a major part of the ultrastable aluminosilicate material, i.e., an amount in excess of 50 weight percent.

While the above-mentioned two bands which appear near 3700 cm.$^{-1}$ and near 3625 cm.$^{-1}$, respecively, appear to be characteristic of the ultrastable aluminosilicate material which is a component of the catalytic composition employed in this invention and have not as yet been described in the literature, it is quite possible that they might appear, at a weak intensity, in the infrared spectra of a decationized Y-type or other aluminosilicate material, if that aluminosilicate material were to be subjected to the proper treatment employing the proper conditions.

It is believed that the ultrastable, large-pore crystalline aluminosilicate material of the catalytic composition that is employed in the process of this invention can be identified properly by the hydroxyl infrared bands near 3700 cm.$^{-1}$ and near 3625 cm.$^{-1}$, particularly the former, when considered in conjunction with the characteristic small cubic unit cell dimension. For example, such identification or description will distinguish the ultrastable aluminosilicate material from the "high-silica" faujasites described in Dutch patent application 6707192, which "high-silica" faujasites have the small cubic unit cell but do not exhibit the 3700 cm.$^{-1}$ and 3625 cm.$^{-1}$ infrared bands. Furthermore, while unstable decationized Y-type aluminosilicate materials may provide hydroxyl infrared bands near 3700 cm.$^{-1}$ and near 3625 cm.$^{-1}$, if such aluminosilicate materials were to receive the proper treatment, they do not exhibit the appropriate smaller cubic unit cell dimension that is characteristic of the ultrastable, large-pore crystalline aluminosilicate material.

In addition to the unique hydroxyl infrared bands and the smaller cubic unit cell dimension, the ultrastable, large-pore crystalline aluminosilicate material is characterized by an alkali metal content that is less than 1 weight percent.

The ultrastable, large-pore crystalline aluminosilicate material can be prepared from certain faujasites by subjecting the latter to special treatment under specific conditions. The preparation usually involves a first step wherein most of the alkali metal cation is cation-exchanged with an ammonium salt solution to leave approximately enough alkali metal cations to fill the bridge positions in the faujasite structure. After this cation-exchange treatment, the aluminosilicate material is subjected to a heat treatment at a temperature within the range of about 700° F. (1292° F.) to about 800° C. (1472° F.), or higher. The heat-treated aluminosilicate material is then subjected to further cation-exchange treatment to remove additional residual alkali metal cations. A typical preparation of the ultrastable, large-pore crystalline aluminosilicate material is considered in U.S. Pat. 3,293,192.

The Group-VIII-metal-exchanged Y-type molecular sieves comprise a particular type of crystalline zeolitic aluminosilicate which has been cation-exchanged with a Group VIII metal. Preferably, nickel is the Group VIII metal employed. The Y-type molecular sieves, sometimes referred to as "zeolite Y," have a $SiO_2/Al_2O_3$ ratio that is greater than about 3.0 and a chemical formula expressed in terms of mole oxides as:

$$0.9\pm0.2Na_2O:AlO_3:USiO_2:VH_2O$$

where U represents a value greater than 3 up to about 6 and V may be a value up to about 9. These properties, as well as the characteristic X-ray diffraction pattern, and the method of preparation of the Y-type molecular sieves are discussed in U.S. Pat. 3,130,006, assigned to Union Carbide Corporation.

The Y-type molecular sieves employed in the catalytic composition of this invention are cation-exchanged with a selected Group VIII metal. Typically, the sieves are contacted with an aqueous solution of the cations of the Group VIII metal for an extended period of time, or for several successive periods of time, at elevated temperatures. Advantageously, the Y-type molecular sieves may be contacted with the aqueous solution containing the cations of selected Group VIII metal for a specified length of time. Then, the sieves thus treated are filtered and washed with distilled water. This cation-exchange procedure may be repeated several times. After the sieves are filtered and washed in the last exchange step, they are dried. Of course, the greater the length of time that the sieves are contacted with the aqueous solution containing the exchangeable cations, the more complete is the desired exchange.

As an alternative method of cation exchange, the Y-type molecular sieves may be contacted first with a solution of an ammonium salt or other salt which decomposes to leave the hydrogen-form of sieves when the sieves so contacted are dried and/or calcined. The thusly-treated molecular sieves may be contacted subsequently with an aqueous solution of a suitable compound of the selected Group VIII metal, washed, dried and calcined.

Advantageously, the catalytic composition of this invention can be prepared as follows. The ultrastable, large-pore crystalline aluminosilicate material, in a finely-divided state, may be added to a hydrogel of a silica-alumina and blended therein to form a homogeneous mixture. The hydrogenation components, i.e., the metals of Group VI-A and Group VIII, may be added in the form of heat-decomposable components to this homogeneous mixture. The resulting composition is then thoroughly mixed. The heat-decomposable components may be added in a single solution or in several solutions. The resulting blended composition is then dried to a moisture content ranging between 10 and 40 percent by weight, based on the total weight of the composition. The dried material is then calcined at a temperature between 900° F. and 1050° F. Prior to calcining, the dried material may be pulverized; or it may be pulverized, pelleted, calcined, and then subsequently pulverized to a fine mesh material prior to being admixed with component (B).

Component (B) of the catalytic composition of this invention may be prepared by exchanging the sodium-form of Y-type molecular sieves with a solution of the Group VIII metal cation. In the case where nickel is the Group VIII cation, a solution of nickel nitrate may be used advantageously. The Y-type molecular sieves are contacted with the solution of nickel nitrate for 4 hours, then filtered and washed with distilled water. This exchange step may be repeated several times, for example, 3 more times. After the last exchange step, the nickel-exchanged sieves may be dried.

The catalytic composition of this invention is then finalized by physically admixing component (A) with component (B) in the desired proportions of each. Of course, component (A) and component (B) each must be in a finely-divided state.

An embodiment of the process of this invention is presented in Example I.

EXAMPLE I

Toluene was disproportionated in a bench-scale hydrocarbon-conversion unit. This bench-scale test unit employed a reactor which was 20 inches long and which possessed an I.D. of 0.62 inch. The temperature of the catalyst bed in the reactor of this bench-scale test unit was measured by an axial thermowell which extended from the top reactor closure down through the catalyst bed in the vertical reactor. The catalyst bed that was employed contained 30 cc. of catalyst and provided a catalyst-bed length of about 6 inches. The unit was operated under once-through operation, i.e., it did not use recycled hydrocarbons and/or recycled hydrogen. Products were recovered by means of conventional small-scale product recovery equipment. Samples obtained from the unit were analyzed by gas-chromatographic methods.

The feedstock employed in this test was A.C.S.-reagent-grade toluene supplied by the General Chemical Division of Allied Chemical Corporation.

The catalyst used was a physical particulate mixture of 2 components. The first component comprised about 2.5 percent by weight cobalt oxide and about 5 percent by weight molybdenum trioxide, based on the weight of this component, on a co-catalytic acidic support. This co-catalytic acidic support comprised about 13 percent by weight of ultrastable, large-pore crystalline aluminosilicate material as described above, suspended in a matrix of amorphous silica-alumina. The second component of this catalytic composition comprised nickel-exchanged Y-type molecular sieves containing 7.8 percent by weight nickel, based on the weight of this second component.

The catalyst was pretreated by passing once-through hydrogen over it for 2 hours at a flow rate of 199,000 standard cubic feet of hydrogen per hour per ton of catalyst, a pressure of 300 p.s.i.g., and a temperature of 750° F.

In this example the reaction was controlled by adding carbon disulfide with the feed. Approximately 0.2 volume percent carbon disulfide was added with the feed. Specific operating conditions for this test included a pressure of 300 p.s.i.g., a temperature of 890° F. to 900° F., a LHSV of 1.0 volume of toluene per hour per volume of catalyst (a weight hourly space velocity of 1.5 grams of oil per hour per gram of catalyst), and a hydrogen-to-oil ratio of about 20,000 s.c.f.b.

Pertinent data obtained from this test are presented in Table I.

TABLE I

| | | |
|---|---|---|
| Hours on oil | 26 | 50 |
| Temp., °F | 892 | 899 |
| $H_2$/HC ratio, m.s.c.f.b | 21.1 | 23.2 |
| Recovery, wt. percent: | | |
| $C_2$ plus gas | 6.2 | 3.8 |
| Liquid | 92.7 | 94.3 |
| Conversion, wt. percent | 43.0 | 41.2 |
| Product composition, wt. percent: | | |
| Cracked product | 16.7 | 12.0 |
| Benzene | 37.7 | 38.4 |
| Xylenes | 40.5 | 43.2 |
| Heavier | 5.1 | 6.4 |
| m plus p/o-xylene | 3.51 | 3.49 |

In the above data, the values for conversion were normalized to 100 percent, based on the toluene feed to the reactor. Moreover, the heavier material of the product was mainly trimethylbenzenes. The ratio of xylene isomers is presented as a ratio of the sum of the meta- and para-isomers to the ortho-isomer, in view of the fact that the meta- and para-isomers are very difficult to separate from each other. The cracked product is defined as the non-aromatic product having a molecular weight lower than the feedstock.

The above data indicate that considerable disproportionation of the toluene occurred at 26 hours on oil and at 50 hours on oil. Moreover, the data show that no appreciable deactivation of the catalyst occurred during the first 50 hours when feed was being treated in the test. Approximately 80 percent of the product consisted of benzene and ethylbenzene-free xylenes; the remainder of the product was split between high-boiling material, which was mostly trimethylbenzenes, and cracked product. The data also indicate that the cracked product decreases with time at a much more rapid rate than does the overall conversion.

Another embodiment of the process of this invention is presented in Example II.

EXAMPLE II

Toluene was disproportionated in a bench-scale hydrocarbon-conversion unit. The unit, toluene, and catalyst were as described in Example I.

The catalyst was pretreated by passing a hydrogen gas stream containing a minor amount of hydrogen sulfide (about 8 volume percent) over the catalyst for 2 hours at a pressure of 300 p.s.i.g. The flow rate of this gas stream was maintained at a level of about 130,000 standard cubic feet per hour per ton of catalyst. The temperature was raised from about 500° F. to 750° F. during the first hour of this pretreatment and maintained at the latter value for the second hour. This was the only effort made to add sulfur to the reaction zone.

Specific operating conditions for this test included a pressure of 300 p.s.i.g., a temperature of 945° F. to 955° F., a LHSV of about 2.6 volumes of toluene per hour per volume of catalyst, a weight hourly space velocity of 3.9 grams of toluene per hour per gram of catalyst, and a hydrogen-to-oil ratio of about 20,000 s.c.f.b.

Pertinent data obtained from this test are presented in Table II.

TABLE II

| | | | |
|---|---|---|---|
| Hours on oil | 23 | 47 | 71 |
| Temp., °F | 947 | 951 | 949 |
| $H_2$/HC ratio m.s.c.f.b | 20.9 | 18.3 | 19.0 |
| Recovery, we. percent: | | | |
| $C_1$–$C_5$ gas | 1.9 | 1.9 | 1.7 |
| Liquid ($C_3^+$) | 95.5 | 97.2 | 99.6 |
| Conversion, wt. percent | 35.7 | 35.7 | 32.8 |
| Product composition, wt. percent: | | | |
| Cracked product | 5.9 | 5.9 | 5.5 |
| Benzene | 42.8 | 42.4 | 44.1 |
| Xylenes | 47.5 | 47.5 | 46.7 |
| Heavier | 3.8 | 4.2 | 3.7 |
| m plus p/o-xylene | 33.3 | 3.31 | 3.34 |

In the above data, the values for conversion were normalized to 100 percent, and the heavier material, cracked product, and xylene-isomer ratio were defined as in Example I.

These data show that by appropriate adjustment of the temperature and space velocity variables vastly improved selectivities over those presented in Example I are attainable. The data show, in addition, that the sulfiding of the metals of the catalyst can be carried out prior to the disproportionation operation to effectively inhibit the demethanation reaction.

To further exemplify the process of the present invention, the attached figure depicts the simplified process flow scheme for a specific embodiment of the invention.

Fresh toluene is introduced into the process system by way of line 1. Recycle toluene from line 2 is mixed with the fresh toluene in line 1. Hydrogen-containing gas is introduced into the toluene stream by way of line 3, carbon disulfide is added by way of line 3a, and the resulting mixture is passed through line 4 and heat-exchange equipment (not shown) into reaction zone 5. Reaction zone 5 contains a catalyst bed or catalyst beds 6. The catalyst in this reaction zone is a physical particulate mixture of 2 components. The first component of this mixture comprises 2.5 percent by weight CoO and 5 percent by weight $MoO_3$ on a co-catalytic support comprising 13 percent by weight ultrastable, large-pore, crystalline aluminosilicate material suspended in a matrix of amorphous silica-alumina. The silica-alumina contains 13 percent alumina. The catalyst composite contains 90 percent by weight of this first component. The second component of this catalyst composite is nickel-exchanged Y-type molecular sieves and contains 7.8 percent by weight of nickel. Operating conditions in this reaction zone 5 include a pressure of 300 p.s.i.g., a temperature between about 850° F. and 1000° F., a LHSV within the range between 0.1 and 20 volumes of toluene per hour per volume of catalyst, and a hydrogen-to-oil ratio that does not exceed 50,000 s.c.f.b.

The effluent from reaction zone 5 is passed through line 7 to high pressure separator 8 wherein the light gases containing hydrogen are separated therefrom. The separated hydrogen-containing gas is passed through line 9 to line 3 to be recycled to reaction zone 5. Make-up hydrogen is added to this hydrogen-containing gas by way of line 10. The liquid effluent from high pressure separator 8 is passed through line 11 to control valve 12, which regulates the pressure of the reaction system and permits the pressure to be reduced prior to the passage of the liquid effluent through line 13 to fractionation zone 14. In fractionation zone 14, the liquid is separated into alkanes, which have resulted from some cracking occurring in the reaction zone, benzene, toluene, xylenes, and some trimethylbenzenes. Each of these streams is separated from one another in the fractionation zone. The alkanes are removed from fractionation zone 14 by way of line 15. Benzene is removed by way of line 16, while toluene is taken from line 17 and the xylenes are removed by way of line 18. Small amounts of trimethylbenzenes are removed from fractionation zone 14 by way of line 19.

The toluene in line 17 is conducted to line 2 where it joins the fresh toluene from line 1 to be sent to reaction zone 5. Suitably, the xylene stream in line 18 may be sent to a second fractionation zone, where the meta-xylene and para-xylene are separated from the ortho-xylene. The meta-xylene and para-xylene stream is passed to a fractional crystallization installation, where para-xylene is fractionally crystallized out of the meta-xylene. The para-xylene may be used in the manufacture of terephthalic acid, while the ortho-xylene is employed in the manufacture of phthalic anhydride. The meta-xylene may be passed to an isomerization reaction zone employing a catalyst similar to the catalyst that was used in the disproportionation reaction zone. However, in this reaction zone the meta-xylene is isomerized to an equilibrium mixture of xylenes. Any appreciable amounts of trimethylbenzenes may be separated by suitable means, such as fractional distillation, and the thusly-separated components oxidized to appropriate organic acids, if this is desirable.

The above embodiment is presented for illustration purposes only and is not intended to limit the scope of the present invention.

What is claimed is:

1. A process for the disproportionation of single-ring aromatic hydrocarbons, which process comprises contacting in a reaction zone said single-ring aromatic hydrocarbons with a catalytic compostion under suitable disproportionation conditions, said catalytic composition comprising a physical particulate mixture of a component (A) and a component (B), said component (A) comprising an amorphous silica-alumina support having dispersed uniformly through the matrix thereof an ultrastable, large-pore crystalline aluminosilicate material and having impregnated thereon a metal of Group VI-A of the Periodic Table of elements and a metal of Group VIII of the Periodic Table, and said component (B) comprising Y-type molecular sieves which have been cation-exchanged with a metal of Group VIII of the Periodic Table.

2. The process of claim 1 wherein said component (A) of said catalytic composition is present in an amount between about 50 and about 95 percent by weight and said component (B) is present in an amount between about 50 and about 5 percent by weight, based on the total weight of said catalytic composition.

3. The process of claim 2 wherein a substantial amount of said ultrastable, large-pore crystalline aluminosilicate material is characterized by well-defined hydroxyl infrared bands near 3700 cm.$^{-1}$ and near 3625 cm.$^{-1}$ and wherein said ultrastable, large-pore crystalline aluminosilicate material is characterized further by an alkali metal content that is less than one weight percent, a maximum cubic unit cell dimension of 24.55 A, and a superior ability to withstand repeated wetting-drying cycles.

4. The process of claim 3 wherein said ultrastable, large-pore crystalline aluminosilicate material of said catalytic composition is present in an amount within the range between about 2 and about 50 percent by weight, based on the weight of said component (A).

5. The process of claim 4 wherein said metal of Group VI-A of said component (A) is molybdenum and said metal of Group VIII of said component (A) is cobalt, said metals of said component (A) being present as their oxides, said molybdenum being present as 4 to 15 percent by weight $MoO_3$ and said cobalt being present as 2 to 5 percent by weight CoO, based on the weight of said component (A), and wherein said metal of Group VIII of said component (B) is nickel and is present in an amount between about 0.5 and about 10 percent by weight, based on the weight of said component (B).

6. The process of claim 5 wherein said silica-alumina of said catalytic composition is a low-alumina silica-alumina.

7. The process of claim 5 wherein said suitable disproportionation conditions include a temperature within the range between about 700° F. and about 1100° F., a pressure within the range between about 100 p.s.i.g. and about 1000 p.s.i.g., an LHSV within the range between about 0.1 and 20 volumes of hydrocarbon per hour per volume of catalyst, and a hydrogen-to-oil ratio within the range between about 1000 s.c.f.b. and about 50,000 s.c.f.b.

8. The process of claim 7 wherein a sulfur-providing compound is added to said reaction zone in a substantial amount, said substantial amount being sufficient to effectively inhibit demethanation in said reaction zone.

9. A process for the disproportionation of toluene, which process comprises contacting in a reaction zone said toluene with a catalytic composition under suitable disproportionation conditions, said catalytic composition comprising a physical particulate mixture of a component (A) and a component (B), said component (A) comprising an amorphous silica-alumina support having dispersed uniformly through the matrix thereof an ultrastable, large-pore crystalline aluminosilicate material and having impregnated thereon a member selected from the group consisting of cobalt and molybdenum, their oxides, and mixtures thereof and said component (B) comprising Y-type molecular sieves which have been cation-exchanged with nickel, said component (A) being present in an amount between about 50 and about 95 percent by weight and said component (B) being present in an amount between about 50 and about 5 percent by weight, based on the total weight of said catalytic composition, a substantial amount of said ultrastable, large-pore crystalline alumino-silicate material being characterized by well-defined hydroxyl infrared bands near 3700 cm.$^{-1}$ and near 3625 cm.$^{-1}$, said ultrastable, large-pore crystalline aluminosilicate material being characterized further by an alkali metal content that is less than one weight percent, a maximum cubic unit cell dimension of 24.55 A, and a superior ability to withstand repeated wetting-drying cycles and being present in an amount within the range between about 2 and about 50 percent by weight, based on the weight of said component (A), said molybdenum being present in an amount within the range of about 4 to 15 percent by weight, calculated as $MoO_3$ and based on the weight of said component (A), said cobalt being present in an amount within the range of about 2 to 5 percent by weight, calculated as CoO and based on the weight of said component (A), and said nickel being present in an amount between about 0.5 and about 10 percent by weight, based on the weight of said component (B), said suitable disproportionation conditions comprising a temperature within the range between about 850° F. and about 1000° F., a pressure within the range between about 200 p.s.i.g. and 500 p.s.i.g., a LHSV within the range between about 1 and about 10 volumes of hydrocarbon per hour per volume of catalyst, and a hydrogen-to-oil ratio within the range between about 5,000 s.c.f.b. and 30,000 s.c.f.b., and a sulfur-providing compound being added to said reaction zone in a substantial amount, said substantial amount being sufficient to effectively inhibit demethanation in said reaction zone.

10. The process of claim 1 wherein a sulfur-providing compound is added to said reaction zone in a substantial amount, said substantial amount being sufficient to effectively inhibit demethanation in said reaction zone.

11. The process of claim 10 wherein said component (A) of said catalytic composition is present in an amount between about 50 and about 95 percent by weight and said component (B) is present in an amount between about 50 and about 5 percent by weight, based on the total weight of said catalytic composition.

12. The process of claim 11 wherein a substantial amount of said ultrastable, large-pore crystalline aluminosilicate material is characterized by well-defined hydroxyl infrared band near 3700 cm.$^{-1}$ and near 3625 cm.$^{-1}$ and wherein said ultrastable, large-pore crystalline aluminosilicate material is characterized further by an alkali metal content that is less than one weight percent, a maximum cubic unit cell dimension of 24.55 A., and a superior ability to withstand repeated wetting-drying cycles.

13. The process of claim 12 wherein said ultrastable, large-pore crystalline aluminosilicate material of said catalytic composition is present in an amount within the range between about 2 and about 50 percent by weight, based on the weight of said component (A).

14. The process of claim 13 wherein said metal of Group VI–A of said component (A) is molybdenum and said metal of Group VIII of said component (A) is cobalt, said metals of said component (A) being present as their oxides, said molybdenum being present as 4 to 15 percent by weight $MoO_3$ and said cobalt being present as 2 to 5 percent by weight CoO, based on the weight of said component (A), and wherein said metal of Group VIII of said component (B) is nickel and is present in an amount between about 0.5 and about 10 percent by weight, based on the weight of said component (B).

15. The process of claim 14 wherein said silica-alumina of said catalytic compositon is a low-alumina silica-alumina.

16. The process or claim 15 wherein said suitable disproportionation conditions include a temperature within the range between about 700° F. and about 1,100° F., a pressure within the range between about 100 p.s.i.g. and about 1,000 p.s.i.g., a LHSV within the range between about 0.1 and 20 volumes of hydrocarbon per hour per volume of catalyst, and a hydrogen-to-oil ratio within the range between about 1,000 s.c.f.b. and abou 50,000 s.c.f.b.

17. The process of claim 15 wherein said suitable disproportionation conditions include a temperature within the range between about 850° F. and about 1,000° F., a pressure within the range between about 200 p.s.i.g. and 500 p.s.i.g., a LHSV within the range between about 1 and about 10 volumes of hydrocarbon per hour per volume of catalyst, and a hydrogen-to-oil raio within the range between about 5,000 s.c.f.b. and 30,000 s.c.f.b.

18. A process for the disproportionation of toluene, which process comprises contacting in a reaction zone said toluene with a catalytic composition under suitable disproportionation conditions, said catalytic composition comprising a physical particulate mixture of a component (A) and a component (B), said component (A) comprising an amorphous low-alumina silica-alumina support having dispersed uniformly through the matrix thereof an ultrastable, large-pore crystalline alumino-silicate material and having impregnated thereon a member selected from the group consisting of cobalt and molybdenum, their oxides, and mixtures thereof, and said component (B) comprising Y-type molecular sieves which have been cation-exchanged with nickel, said component (A) being present in an amount between about 50 and 95 percent by weight and said component (B) being present in an amount between about 50 and about 5 percent by weight, based on the total weight of said catalytic composition, a substantial amount of said ultrastable, large-pore crystalline alumino-silicate material being characterized by well-defined hydroxy infrared bands near 3700 cm.$^{-1}$ and near 3625 cm.$^{-1}$, said ultrastable, large-pore crystalline aluminosilicate material being characterized further by an alkali metal content that is less than one weight percent, a maximum cubic unit cell dimension of 24.55 A., and a superior ability to withstand repeated wetting-drying cycles and being present in an amount within the range between about 2 and about 50 percent by weight, based on the weight of said component (A), said molybdenum being present in an amount within the range of about 4 to 15 percent by weight, based upon the weight component (A) and calculated at $MoO_3$, and said cobalt being present in an amount within the range of 2 to 5 percent by weight, based on the weight of said component (A) and calculated as CoO, said nickel being present in an amount between about 0.5 and about 10 percent by weight, based on the weight of said component (B), said suitable disproportion conditions comprising a temperature within the range between about 700° F. and about 1,100° F., a pressure within the range between about 100 p.s.i.g. and about 1,000 p.s.i.g., an LHSV within the range between about 0.1 and 20 volumes of hydrocarbon per hour per volume of catalyst, and a hydrogen-to-oil ratio within the range between about 1,000 s.c.f.b. and about 50,000 s.c.f.b., and a sulfur-providing compound being added to said reaction zone in a substantial amount, said amount being sufficient to effectively inhibit demethanation in said reaction zone.

19. A process for the disproportionation of toluene, which process comprises contacting in a reaction zone said toluene with a catalytic composition under suitable disproportionation conditions, said catalytic composition comprising a physical particulate mixture of a component (A) and a component (B), said component (A) comprising an amorphous low-alumina silica-alumina support having dispersed uniformly through the matrix thereof an ultrastable, large-pore crystalline alumino-silicate material and having impregnated thereon a member selected from the group consisting of cobalt and molybdenum, their oxides, and mixtures thereof, said component (B) comprising Y-type molecular sieves which have been cation-exchanged with nickel, said component (A) being present in an amount between about 50 and about 95 percent by weight and said component (B) being present in an amount between about 50 and about 5 percent by weight, based on the total weight of said catalytic composition, a substantial amount of said ultrastable, large-pore crystalline alumino-silicate material being characterized by well-defined hydroxyl infrared bands near 3700 cm.$^{-1}$ and near 3625 cm.$^{-1}$, said ultrastable, large-pore crystalline aluminosilicate material being charged further by an alkali metal content that is less than one weight percent, a maximum cubic unit cell dimension of 24.55 A., and a superior ability to withstand repeated wetting-drying cycles and being present in an amount within the range between about 2 and about 50 percent by weight, based on the weight of said component (A), said molydenum being present in an amount within the range of about 4 to 15 percent by weight, based on the weight of component (A) and calculated as $MoO_3$, and said cobalt being present in an amount within the range of about 2 to 5 percent by weight, based on the weight of said component (A) and calculated as CaO, said nickel being present in an amount between about 0.5 and about 10 percent by weight, based on the weight of said component (B), said suitable disproportionation conditions comprising a temperature within the range between about 850° F. and about 1,000° F., a pressure within the range between about 200 p.s.i.g. and 500 p.s.i.g., an LHSV within the range between about 1 and about 10 volumes of hydrocarbon per hour per volume of catalyst, and a hydrogen-to-oil ratio within the range between about 5,000 s.c.f.b. and 30,000 s.c.f.b, and a sulfur-providing compound being added to said reaction zone in a substantial amount, said substantial amount being sufficient to effectively inhibit demethanation in said reaction zone.

References Cited

UNITED STATES PATENTS

| | | |
|---|---|---|
| 3,140,251 | 7/1964 | Plank et al. |
| 3,140,253 | 7/1964 | Plank et al. |
| 3,393,148 | 7/1968 | Bertolacini et al. |

PAUL M. COUGHLAN, Jr., Primary Examiner

C. R. DAVIS, Assistant Examiner

U.S. Cl. X.R.
260—668